UNITED STATES PATENT OFFICE.

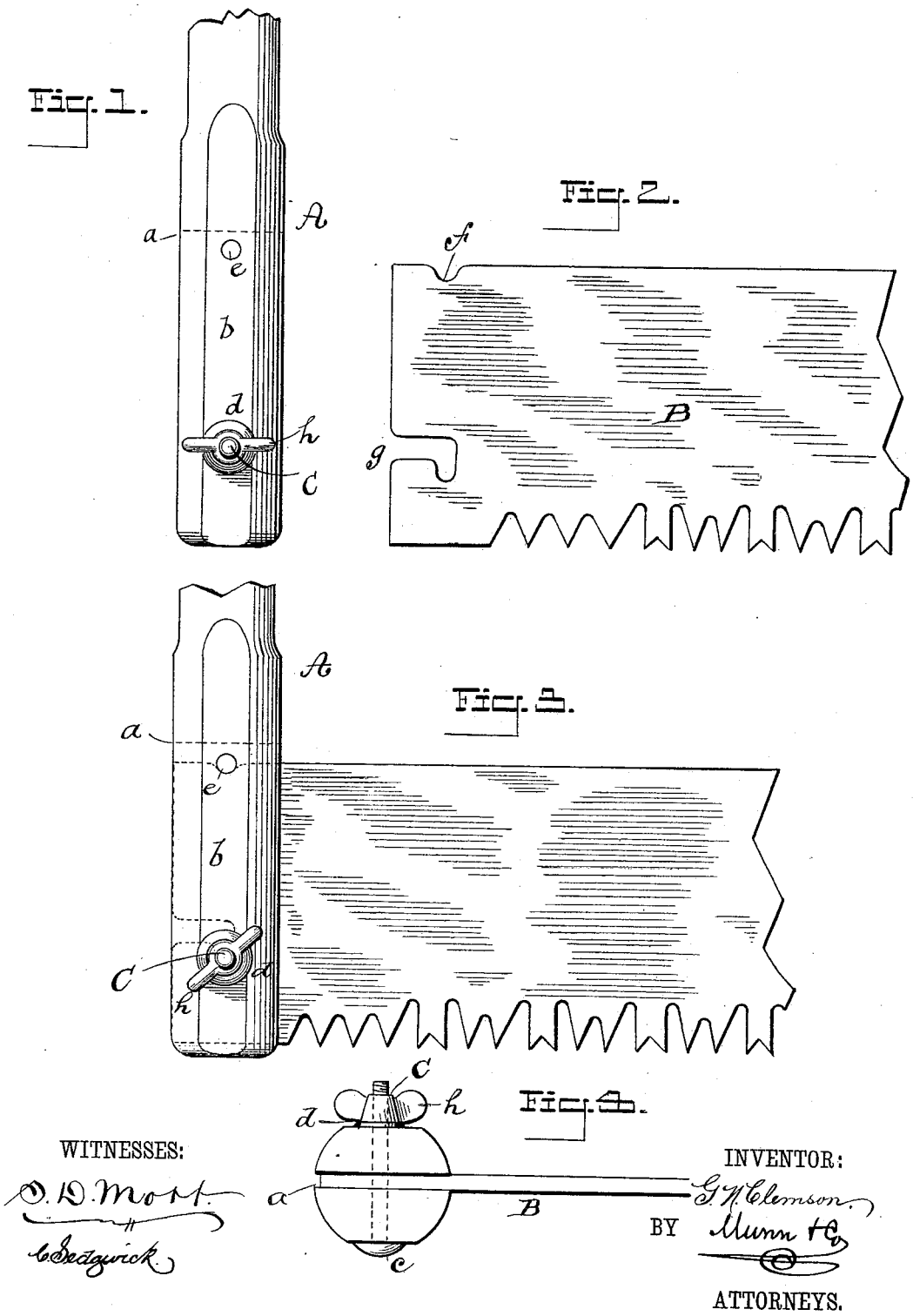

GEORGE N. CLEMSON, OF MIDDLETOWN, NEW YORK, ASSIGNOR TO THE WHEELER, MADDEN & CLEMSON MANUFACTURING COMPANY, OF SAME PLACE.

SAW-HANDLE.

SPECIFICATION forming part of Letters Patent No. 385,844, dated July 10, 1888.

Application filed February 13, 1888. Serial No. 263,782. (No model.)

*To all whom it may concern:*

Be it known that I, GEORGE N. CLEMSON, of Middletown, in the county of Orange and State of New York, have invented a new and Improved Saw-Handle, of which the following is a specification, reference being had to the annexed drawings, forming a part thereof, in which—

Figure 1 is a partial side elevation of my improved saw-handle. Fig. 2 is a side elevation of one end of a saw adapted to receive the handle. Fig. 3 shows the handle attached to the saw; and Fig. 4 is an end elevation of the saw-handle, showing its position on the saw.

Similar letters of reference indicate corresponding parts in all the views.

The object of my invention is to provide a light, inexpensive, and easily-applied handle for long saws, such as are used for cutting logs and timber.

My invention consists in a handle, preferably of wood, slotted for a distance about equal to the width of the saw in connection with which it is to be used, and provided with a pin passing through the handle at right angles to the slot, near the inner end of the slot, and having a clamping-bolt, also passing through the handle near the extremity of the slotted end, at right angles to the slot, and in a saw provided with a nick in the upper edge, for receiving the transverse pin of the handle, and a right-angled slot for receiving the clamping bolt, all as hereinafter more fully described.

The handle A, which is preferably made of wood, is provided with a slot, *a*, which extends from one end inward to a depth about equal to the width of the saw B, in connection with which the handle is used. The thickness of the said slot corresponds with the thickness of the saw, and diametrically-opposite sides of the handle are flattened, forming surfaces *b*, which are parallel with the slot of the handle, and which serve as bearings for the head *c* and washer *d* of the bolt C, which passes through the handle near the extremity of the slotted portion at right angles to the slot. A steel pin, *e*, passes through the handle A at right angles to the slot *a*, near the inner end thereof.

The saw in connection with which the handle is used is provided at the top with a semi-circular nick, *f*, for receiving the pin *e*, and in the end thereof, near the toothed edge, is formed a right-angled slot, *g*, which extends inwardly parallel with the edges of the saw, then downward toward the cutting-edge, as shown in Fig. 2.

The handle A is placed upon the saw B by slipping it over the end of the saw and bringing the bolt C into the right-angled slot *g*, then pushing the handle downward until the bolt C enters the downwardly-extending end of the slot *g*, when the wing-nut *h* upon the bolt is tightened, thereby preventing the handle from becoming accidentally disengaged from the saw. The end of the saw is thus firmly engaged by the entrance of the pin *e* into the nick *f* and the engagement of the bolt C with the angled inner end of the slot *g*.

My improved saw-handle has the advantage of being very light, inexpensive, and of being readily applied to and removed from the saw.

Having thus described my invention, I claim as new and desire to secure by Letters Patent—

The combination, with the saw B, provided with a nick, *f*, in the back thereof, near one end, and a right-angled slot, *g*, extending inward lengthwise of the saw, then downward toward the cutting-edge of the saw, and a straight handle having a longitudinal slot adapted to receive the saw-blade, and provided with a transverse pin, *e*, and bolt *c*, for engaging the nick and slot of the saw, substantially as herein specified.

GEORGE N. CLEMSON.

Witnesses:
HENRY W. WIGGINS,
F. B. HATHAWAY.